United States Patent

Hug

[11] 3,751,666
[45] Aug. 7, 1973

[54] INFRARED GENERATOR

[76] Inventor: William F. Hug, 1100 S. Los Robles St., Pasadena, Calif. 91105

[22] Filed: Oct. 11, 1972

[21] Appl. No.: 296,684

[52] U.S. Cl. .................................. 250/495
[51] Int. Cl. ............................. H01j 35/00
[58] Field of Search ........................ 250/84, 85

[56] References Cited
UNITED STATES PATENTS
2,728,877   12/1955   Fischer ........................ 250/84

*Primary Examiner*—James W. Lawrence
*Assistant Examiner*—C. E. Church
*Attorney*—Harry M. Saragovitz, Edward J. Kelly et al.

[57] ABSTRACT

A pulsed infrared radiation generator comprising a confined molecular energy storing gas and having resonantly driven means for periodically compressing said gas to pressures and temperatures sufficiently high to cause emission of infrared radiation from said gas over a wavelength band determined by the fundamental vibrational wavelength of the gas. By using such a resonantly driven system for periodic compression of the gas within an enclosed chamber, a large portion of the unradiated internal energy in the molecular gas, as well as the kinetic energy of the driven compression mechanism, can be recovered. The generator further includes second energy storing means which may comprise either a second gas-filled chamber arranged back-to-back with the first gas-filled chamber, or a spring attached to the resonantly driven compression mechanism.

16 Claims, 3 Drawing Figures

PATENTED AUG 7 1973   3,751,666

INFRARED GENERATOR

SUMMARY OF THE INVENTION

Gas molecules can be excited at sufficiently high temperature and pressure so that energy of the molecules moves from the normal energy state to a state of higher energy. As the temperature increases, there is more collision between molecules and more molecules are raised to an energy state higher than ground state, thereby absorbing energy. The molecules return rather quickly to their lower energy state, and, in doing so, spontaneously emit electromagnetic radiation. The choice of gas will determine the fundamental vibrational wavelength band. The molecular species which are most applicable for use as infrared radiators in the 2 to 6 micron spectral region are listed in Table I.

TABLE I

| Molecule | Center Wavelength, microns |
| --- | --- |
| HF | 2.42 |
| HCl | 3.34 |
| CO | 4.60 |
| CN | 4.83 |
| NO | 5.25 |
| $CO_2$ | 4.35 |
| $N_2O$ | 4.50 |

The fundamental concept for using molecular gases to provide efficient infrared radiation is that a gas layer is heated to a pressure and temperature sufficient to provide the optimum gas radiation in the fundamental molecular vibration band without exciting appreciably higher vibrational-rotational modes. This excitation of the gas molecules can be achieved by compressing the gas in a quasi-adiabatic manner (with substantially no change in heat energy) and with a resonantly driven gas compressor mechanism whereby at least some of the unradiated internal energy in the molecular gas, as well as some of the kinetic energy of the compressor mechanism during oscillation, can be recovered for further use during succeeding radiation pulses.

The compressor mechanism may be of the electromagnetic type including an armature connectd to a diaphragm which forms a portion of the gas chamber and is driven by an armature current coil energized from a suitable current source for supplying the necessary magnetic field. Such a compressor mechanism has a much greater efficiency in infrared spectral bands than the usual arc discharge because a relatively small amount of radiation is lost at wavelengths outside the rotational-vibrational spectral band.

Ideally, a near adiabatic system is desirable; however, there are some thermal losses during compression owing to infrared radiation, and conduction losses from the compressed gas to the walls of the gas chamber.

The total internal energy of the gas at the peak of compression is equal to the product of the known mass of the molecular gas, the specific heat of the gas at constant volume (per unit mass) and the peak temperature which is related to the initial temperature by the compression ratio to the $\gamma-1$ power where $\gamma$ is the specific heat ratio or the ratio of the specific heat at constant volume to the specific heat at constant pressure. When the gas compression member is released from its position at peak compression, the member will oscillate about the equilibrium position at a natural frequency $\omega_o$ determined by the mass of the member and the compression chamber design. The system energy during compression or expansion remains substantially constant and is equal to the sum of the gas energy and the kinetic energy of the compression member.

SPECIFIC DESCRIPTION OF THE INVENTION

Figure 1:
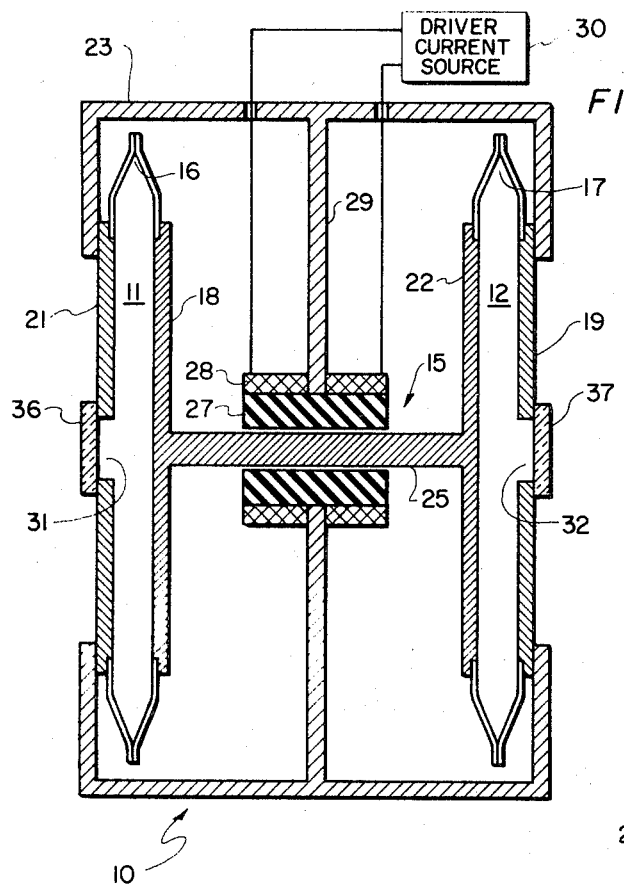
FIG. 1 is a central transverse sectional view showing an embodiment of a resonant molecular gas radiation source according to the invention.
Figure 3:
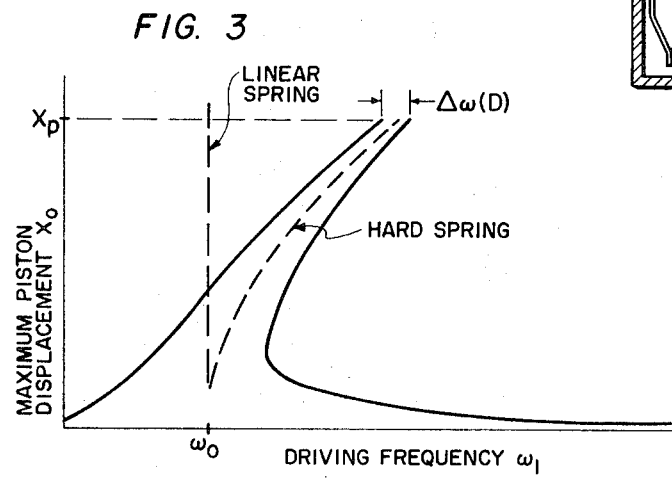
FIG. 3 is a curve illustrating some principles of operation of the devices of FIGS. 1 and 2.

A typical plot showing the affect of driving frequency $\omega_1$ on the displacement $x_o$ of the movable diaphragm 18 (or 22) of the gas chamber (11 or 12) of FIG. 1 is shown in FIG. 3. The condition for resonance (or maximum displacement $x_p$) occurs when the chamber 11 (or 12) of FIG. 1 is completely closed, leaving only the volume of the cylindrical radiating region 31 (or 32). This occurs at a driving frequency $\omega_1$ higher than the theoretical small-displacement natural resonant frequency $\omega_o$, which is given by the relation $$\omega_o^2 = k/M \qquad (1)$$

where M is the mass of the diaphragm and $$K = 2P_o A^2 \gamma / V_o \qquad (2)$$

where $P_o$ and $V_o$ are the initial pressure and volume of the gas in the chamber 11 (or 12), A is the area of the movable diaphragm 18 (or 22), and $\gamma$ is the specific heat ratio above described. It is seen that the resonant frequency of the mechanical system is a function of its displacement.

The dashed vertical line in FIG. 3 represents the condition for a linear spring. The influence of the gas on the driving assembly is shown in FIG. 3. The maximum displacement $x_o$ of the diaphragms 18 or 22 first increases with driving frequency $\omega_1$; then, after varying somewhat irregularly, $x_o$ decreases substantially linearly at a much reduced displacement range. The dashed curve indicates that theoretical response for a hard spring. Both of the dashed curves indicate the frequency versus displacement characteristics for a lossless (adiabatic) system. Owing to system losses, the actual characteristic is an approximation of that for the hard spring and is indicated in the solid curve. The resonant gas compressor is a non-linear device which exhibits mechanical resonance over a broad range of frequencies above the natural frequency $\omega_o$. This curve expresses the fact that if the diaphragm is displaced, with no harmonic driving force, to some amplitude and released, the diaphragm will oscillate at a frequency which is proportional to the displacement and not to the low amplitude natural frequency $\omega_o$. For the resonant compressor to act effectively as a radiation source, the maximum amplitude of the motion should be $x_p$, that is, such that the main gas chamber 12 (or 13) is completely closed; in this case, the maximum compression ratio is provided.

The frequency $\omega_1$ of oscillation of the compressor driving assembly is a function of the mass and area of the driver mechanism, and also is affected by the initial gas volume and the specific heat ratio of the particular gas being used. The resonant frequency $\omega_1$ of the driver assembly can be increased by increasing the specific heat ratio of the gas, by increasing the diameter of the diaphragm, or by increasing the initial pressure of the gas. The resonant frequency $\omega_1$ also can be increased by decreasing the initial volume of the gas or by decreasing the mass of the driver assembly.

Referring to FIG. 1, a double-ended source 10 is shown which includes two spaced, sealed diaphragm compression chambers 11 and 12 disposed back-to-back. These compression chambers are driven by an appropriate driver assembly 15. The compression chambers 11 and 12 are filled with a molecular gas having the desired fundamental band-center-wavelength. The chambers 11 and 12 are provided with respective flexible chamber seals 16 and 17 to allow for movement of the movable assembly 18, 22, 25 relative to the corresponding stationary portions 21 and 19 of the compression chambers. The portions 21 and 19 are rigid members and either can be attached to the rigid frame 23, or can be made integral with frame 23. The driver assembly 15 shown in FIG. 1 includes an armature 25 which mechanically interconnects the two movable diaphragms 18 and 22, a surrounding core 27 about which is wound an appropriate driver coil 28 energized from an appropriate driver source 30, and a supporting web 29 for rigidly supporting the core 27 relative to the frame 23. The construction of the driver assembly 15 shown in FIG. 1 is by way of example and other similar driver means for the compression chambers 11 and 12 can be used. For example, the coil core 27 may be supported other than by the web 29. Also, by way of example, the driving head could be connected directly to one of the movable diaphragms while the other movable diaphragm could be connected to the first movable diaphragm, for example, by a circular array of rods.

The armature-compression diaphragm combination 25, 18, 22 is driven close to the natural frequency thereof in response to the excitation driver source 30 nd oscillates along the axis of symmetry of the device. The molecular gas in chambers 11 and 12 alternately is compressed into a much smaller compression region 31 and 32, respectively, formed within the fixed diaphragms 21 and 19 and partially bounded by corresponding infrared-transparent windows 36 and 37. As the driver core 25 moves in the direction of a given one of the two chambers 11 and 12, the gas in that chamber is compressed, as well as the gas in the corresponding one of the small regions 31 (or 32) thereof, until, at or near maximum displacement of the driver assembly 15, a sufficiently high temperature and pressure is achieved to allow the molecular gas in one of the chambers 11 (or 12) to radiate at the desired wavelength band through the corresponding infrared transmitting windows 36 (or 37).

Only a portion of the energy during compression of the gas in chambers 11 and 12 is converted into radiant infrared energy. Some of the energy contributed by the driver assembly 15 is lost in heat flow (conduction) to the walls of the chambers and from convection losses into the driver means. Because of the energy losses during compressing owing to the radiation, conduction and convection mentined mentioned the temperature and pressure of the gas in the chambers 11 and 12 are somewhat less than adiabatic predictions. After peak compression, pressure force causes movement of the movable diaphragm and the attached driver core in the opposite direction. For example, as the driver armature 25 and movable diaphragms 18 and 22 of FIG. 1 moves toward the left, the gas in chamber 11 is compressed. The temperature and pressure of the gas in chamber 11 increases while the temperature and pressure of the gas in chamber 12 decreases. When the driver armature and diaphragm assembly come to rest with the gas in chamber 11 compressed into region 31, pressure difference between the gas in chambers 11 and 12 drives the assembly 18, 25, 22 to the right, whereby movable diaphragm 22 compresses the gas in chamber 12 until the pressure and temperature reach a condition suitable for radiation of infrared energy from the gas in the region 32. In other words, a large part of the energy not radiated from chamber 11 is stored in the gas within chamber 11 and is available for driving the assembly 18, 25, 22 to the right. Similarly, energy is stored in the gas confined within chamber 12 following the compression of the gas within chamber 12 and the gas within chamber 12 thus alternates with the gas within chamber 11 as an energy storage means. This condition for radiation of infrared energy is not attained until the compression cycle is well advanced, usually when displcement of a movable diaphragm has just about completely closed off one of the two chambers 11 or 12. Consequently, the actual radiation from the gas in the chambers 11 and 12 occurs in the form of pulses exciting at a repetition frequency equal to that of the exiting source $\omega_1$ for the driver assembly 15, which source can be a sinusoidal source. The frequency at which the driver assembly 15 is moved back and forth determines the frequency at which the pulsed infrared radiation is amplitude modulated and is dependent upon the frequency of the exciting source for the driver armature coil.

If a single-ended source is desired, one of the two chambers 11 and 12 can be filled with an atomic gas, such as argon, which will not radiate sufficiently at the temperatures and pressures produced by the device 10. The passive diaphragm would provide means for storing kinetic energy of the active diaphragm and could be loaded to a pressure to provide a nearly symmetrical force constant for the system.

Figure 2:
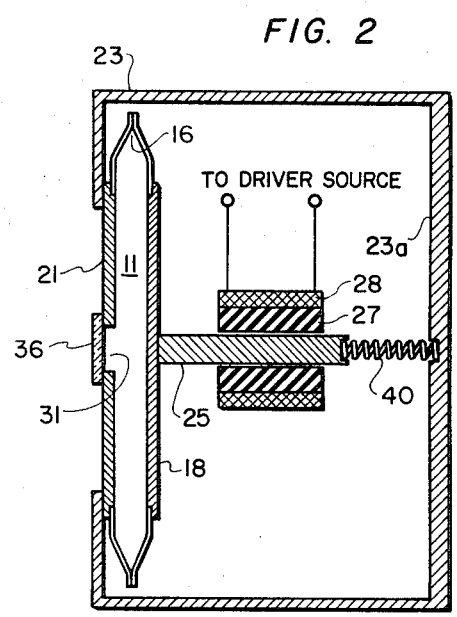
FIG. 2 is a central transverse sectional view showing a modification of the device shown in FIG 1.

Alternatively, as shown in FIG. 2, one of the two chambers can be replaced by a spring 40 mounted within recesses in one end of the armature 25 and in the rear portion 23a of frame 23.

In order to achieve the same radiation pulse frequency for either of these single-ended systems, the natural frequency of the driving assembly 15 must be doubled.

What is claimed is:

1. An infrared radiation source comprising an enclosed chamber having at least a portion thereof transparent to infrared radiation, said chamber containing a molecular gas having a fundamental vibrational wavelength band lying within the desired infrared radiation band and capable of emitting radiation within said infrared band when the pressure thereof exceeds a predetermined value, drive means for periodically compressing said gas until the pressure exceeds said predetermined value, said gas constituting a first energy storage means for storing energy between each period of compression, and second energy storage means to which is imparted during intervals between said periodic compression a substantial portion of the energy stored within said molecular gas.

2. An infrared radiation source according to claim 1 further including means for exciting said drive means at substantially the mechanical resonant frequency thereof.

3. An infrared radiation source according to claim 2 wherein said drive means includes a movable diaphragm partially enclosing said chamber and a rigid member interposed between said movable diaphragm and said second energy storage means.

4. An infrared radiation source according to claim 2 wherein said second energy storage means is a confined gas.

5. An infrared radiation source according to claim 4 wherein said confined gas is a molecular gas having a fundamental vibrational wavelength band lying within the desired infrared radiation band.

6. An infrared radiation source according to claim 2 wherein said second energy storage means is a spring.

7. An infrared radiation source according to claim 2 wherein said drive means includes a movable diaphragm partially enclosing said chamber and a rigid member interposed between said movable diaphragm and said second energy storage means.

8. An infrared radiation source according to claim 7 wherein said second energy storage means is a confined gas.

9. An infrared radiation source according to claim 7 wherein means mans for exciting includes an electrical coil surrounding said rigid member.

10. An infrared radiation source according to claim 1 whrein said drive means includes a movable diaphragm partially enclosing said chamber and a rigid member interposed between said movable diaphragm and said second energy storage means.

11. An infrared radiation source according to claim 10 wherein said second energy storage means is a second chamber which contains a molecular gas and which is partially bounded by a flexible member engaging said rigid member.

12. An infrared radiation source according to claim 10 wherein said second energy storage means is a spring attached to said rigid member.

13. An infrared radiation source according to claim 1 wherein said second energy storage means is a confined gas.

14. An infrared radiation source according to claim 13 wherein said confined gas is a molecular gas having a fundamental vibrational wavelength band lying within the desired infrared radiation band.

15. An infrared radiation source according to claim 13 wherein said confined gas is incapable of providing infrared radiation.

16. An infrared radiation source according to claim 1 wherein said second energy storage means is a spring.

* * * * *

PO-1050
(5/69)

UNITED STATES PATENT OFFICE
CERTIFICATE OF CORRECTION

Patent No. 3,751,666                    Dated August 7, 1973

Inventor(s) William F. Hug

It is certified that error appears in the above-identified patent and that said Letters Patent are hereby corrected as shown below:

Title page, after name and address of inventor, insert -- Assignee: The United States of America as represented by the Secretary of the Army, Washington, D.C. --

Signed and sealed this 19th day of November 1974.

(SEAL)
Attest:

McCOY M. GIBSON JR.                C. MARSHALL DANN
Attesting Officer                  Commissioner of Patents